(12) United States Patent
Panotopoulos (10) Patent No.: US 7,446,658 B2
(45) Date of Patent: Nov. 4, 2008

(54) IDENTIFICATION (ID) SYSTEM AND METHOD OF OPERATION THEREOF

(75) Inventor: George Panotopoulos, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 162 days.

(21) Appl. No.: 11/371,863

(22) Filed: Mar. 9, 2006

(65) Prior Publication Data

US 2007/0210920 A1    Sep. 13, 2007

(51) Int. Cl.
*H04Q 5/22* (2006.01)
*H04Q 7/00* (2006.01)
*G08B 1/00* (2006.01)
*G08B 1/08* (2006.01)
*G08B 23/00* (2006.01)
*G08B 21/00* (2006.01)
*G01S 1/00* (2006.01)
*G01S 5/00* (2006.01)

(52) U.S. Cl. ............. 340/539.3; 340/539.1; 340/539.11; 340/539.13; 340/572.1; 340/573.1; 340/635; 340/10.1; 340/10.33; 340/10.51; 342/357.01; 342/357.06; 342/357.07

(58) Field of Classification Search ............... 340/572.1, 340/573.1, 539.11, 539.13, 635, 539.1, 10.1, 340/10.33, 10.51, 10.52; 342/357.01, 357.07
See application file for complete search history.

(56) References Cited

U.S. PATENT DOCUMENTS

| 5,134,277 | A | * | 7/1992 | Yerbury et al. | ........ 250/214 RC |
| 5,168,263 | A | * | 12/1992 | Drucker | ...................... 340/571 |
| 5,241,542 | A | * | 8/1993 | Natarajan et al. | ........... 370/311 |
| 5,387,993 | A | * | 2/1995 | Heller et al. | ................. 398/151 |
| 5,742,238 | A | * | 4/1998 | Fox | ........................ 340/825.49 |
| 5,887,176 | A | * | 3/1999 | Griffith et al. | ............... 713/320 |
| 6,700,493 | B1 | * | 3/2004 | Robinson | .................. 340/573.1 |
| 6,700,533 | B1 | * | 3/2004 | Werb et al. | ............. 342/357.07 |
| 7,038,584 | B2 | * | 4/2004 | Eagleson et al. | ............ 340/905 |
| 6,838,992 | B2 | * | 1/2005 | Tenarvitz | .................. 340/573.1 |
| 7,017,808 | B2 | * | 3/2006 | Holzer | ........................ 235/385 |
| 7,072,697 | B2 | * | 7/2006 | Lappetelainen et al. | ..... 455/574 |
| 7,107,009 | B2 | * | 9/2006 | Sairanen et al. | ............. 455/41.1 |
| 2006/0145815 | A1 | * | 7/2006 | Lanzieri et al. | ............. 340/10.2 |
| 2007/0115137 | A1 | * | 5/2007 | Lyon et al. | ............. 340/825.49 |
| 2007/0139199 | A1 | * | 6/2007 | Hanlon | ..................... 340/572.1 |

* cited by examiner

Primary Examiner—George A Bugg
Assistant Examiner—Lam P Pham (57) ABSTRACT

An identification (ID) tag, in one exemplary embodiment of the invention, includes a motion sensor that generates a trigger signal upon sensing motion. The trigger signal is used to place the ID tag in either an active mode or a sleep mode.

9 Claims, 8 Drawing Sheets

IDENTIFICATION (ID) SYSTEM AND METHOD OF OPERATION THEREOF

DESCRIPTION OF THE RELATED ART

The use of identification (ID) tags to identify and track objects, especially non-stationary objects, has been around for several years and has been implemented in a variety of ways. A few examples of ID tags include: a bar-code label affixed to a parcel, an anti-theft tag attached to a product in a store, an anti-theft device embedded in the spine of a library book, and an employee ID badge providing automated access to a workplace.

The examples cited above generally utilize passive elements that do not consume power from a power source. Specifically, the bar-code label is made of paper, the anti-theft device has a resonating element—an embedded inductor for example, and the ID badge incorporates a magnetic strip. None of these passive elements require a power supply for the ID tag to be operational.

However, in contrast to these passive ID tags, there is another class of ID tags that incorporate active components requiring a power supply for operation. The power supply is typically implemented in the form of a battery embedded in the ID tag along with one or more active components of the ID tag circuitry. One example, among many, of such an "active" ID tag is a radio frequency identification (RFID) tag that uses a radio frequency (RF) transmitter to communicate with an RF receiver located in a tag reader. The RF transmitter of the ID tag is generally implemented in the form of an integrated circuit (IC).

A further example of an active tag is provided by a so-called "smart" card that is used in various applications, including identification/tracking applications. A smart card incorporates a memory chip that is powered by a battery embedded inside the card.

Unfortunately, the use of an active device with an embedded power source leads to a limitation on the life-time of the ID tag because the power source is typically non-rechargeable. As a result of this limitation, ID tag designers have devised various approaches to optimize life-time of the ID tag. In one approach, the various components of the ID tag are selected so as to minimize power consumption. For example, if an IC were to be used, a low power device such as a complementary metal-oxide semiconductor (CMOS) device operating from a low-voltage power supply would be selected. In a second approach, the operating power of a transmitter is reduced, which, unfortunately, places an undesirable limitation on the operating range of the ID tag.

While these approaches have yielded some gains, it is further desirable to provide additional solutions that would minimize power consumption in an ID tag thereby leading to longer operational life-time of the ID tag.

SUMMARY

An identification (ID) tag, in one exemplary embodiment of the invention, includes a motion sensor that generates a trigger signal upon sensing motion. The trigger signal is used to place the ID tag in either an active mode or a sleep mode.

Clearly, some alternative embodiments may exhibit advantages and features in addition to, or in lieu of, those mentioned above. It is intended that all such alternative embodiments be included within the scope of the present invention, and be protected by the accompanying claims.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

DETAILED DESCRIPTION

The various embodiments generally describe systems and methods related to selectively placing an identification (ID) tag in a sleep mode for reducing power consumption in the ID tag. In one exemplary embodiment, the ID tag is placed in the sleep mode by using a motion sensor. In another exemplary embodiment, the ID tag is placed in the sleep mode by using a sleep timer. These and other aspects of the invention will be described below in further detail.

Figure 1:
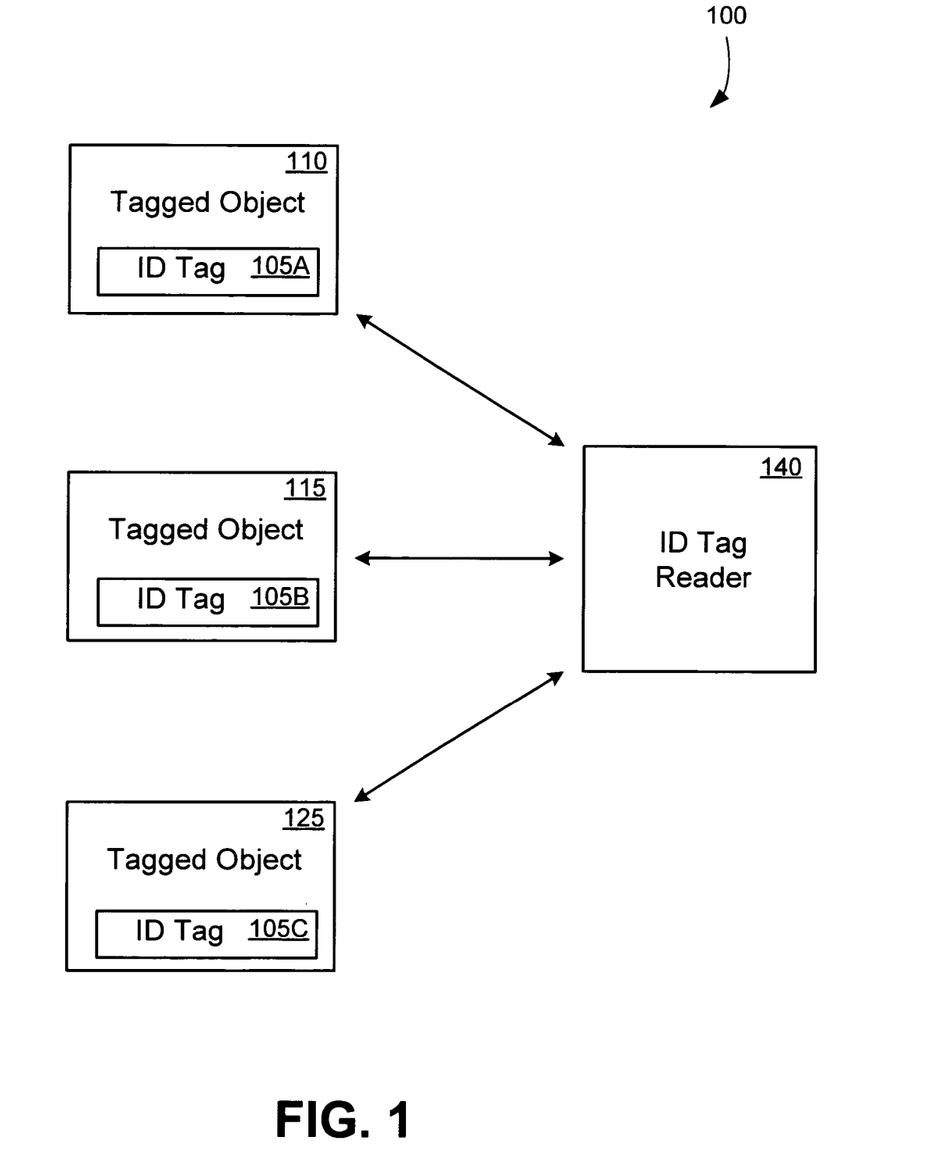
FIG. 1 shows an exemplary identification system in accordance with the invention, the system including several tagged objects, each containing an ID tag that is communicatively coupled to a central ID tag reader.

FIG. 1 shows an exemplary identification system 100 in accordance with the invention. Identification system 100 includes several tagged objects each containing an ID tag that is communicatively coupled to a central ID tag reader 140. Each of the ID tags communicates various types of information about the tagged object to the central ID tag reader. In some applications, for example, in cargo transport applications, the information pertains to the location of the tagged object. In some other applications such as toll collection for cars traveling through a toll booth, the information pertains to financial data related to toll payment.

It will be understood that identification system 100 can be configured in various ways. For example, in a first configuration, both the tagged objects as well as the ID tags are identical to one another. In a second configuration, the ID tags are similar but each of the tagged objects is different.

Furthermore, various types of technology may be used to implement the ID tags as well as other components of identification system 100. For example, in a first exemplary embodiment, the ID tags are radio frequency identification (RFID) tags that use radio frequency (RF) communication links to communicatively couple the ID tags to an RFID tag reader, which is configured to operate using RF frequencies. In a second exemplary embodiment, the ID tags are infra-red (IR) tags that use IR communication links to communicatively couple the ID tags to an ID tag reader configured to operate using IR frequencies. In a third exemplary embodiment, the ID tags are parts of an optical identification system that uses optical communication links to communicatively couple the ID tags to the ID tag reader, which is configured to operate optically.

Tagged objects 110, 115, and 125 of FIG. 1, represent various types of objects such as, but not limited to, cargo, vehicles, stored goods, and people. In some cases, the tagged objects remain stationary all the time whereas in other cases the tagged objects are non-stationary. Furthermore, non-stationary tagged objects may move constantly or may move infrequently.

Operation of identification system 100 will now be described using one among many exemplary applications. In this exemplary application, tagged object 110 is a first item stored upon a shelf located on the sales floor of a store. Tagged object 115 is a second item stored upon a pallet in the storeroom of the store. Tagged object 125 is a third item that is currently being carried by a customer to a payment counter in the store.

ID tag 105C of tagged object 125, the third item, actively communicates with ID tag reader 140 as the customer is in motion. The communication informs the ID tag reader 140 that tagged object 125 is being moved. This information may be used by ID tag reader 140 to track tagged object 125 to ensure that the object is not illegally removed from the store without payment being made at the payment counter.

ID tags 105A and 105B have previously communicated the position information of tagged objects 110 and 115 to ID tag reader 140. Since these two tagged objects have not been moved subsequently, the position information stored in ID tag reader 140 does not require any further updating. Consequently, it is desirable under this condition, that ID tags 105A and 105B have minimal power consumption. This is done by placing each of the ID tags 105A and 105B in a sleep mode, wherein the two tags are in an "offline" state, in accordance with the invention.

It is additionally desirable that ID tags 105A and 105B be awakened to an active mode if either of the respective tagged objects 110 and 115 is moved. For example, ID tags 105A is awakened when a customer lifts tagged object 110 from the shelf located on the sales floor. Similarly, ID tag 105B is awakened when a store worker carries tagged object 115 from the storeroom into the store. When in the active mode, either of the two ID tags 105A and 105B is in an "online" state. These and other aspects of the invention will be described below in further detail using other figures.

Figure 2:
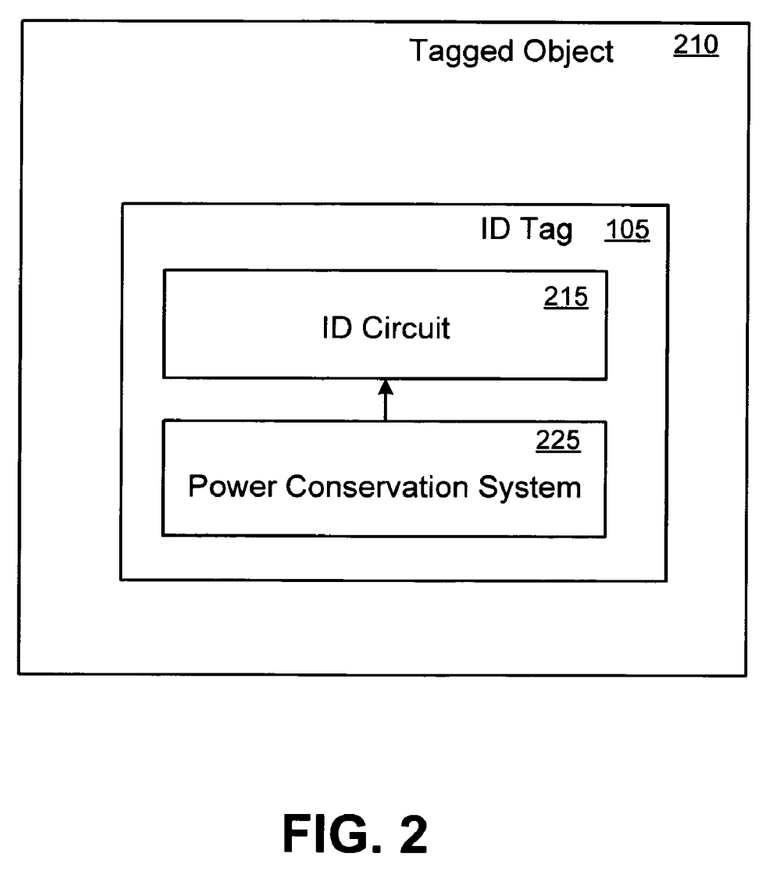
FIG. 2 shows further details of an ID tag of FIG. 1.

FIG. 2 shows certain details of an ID tag 105 in accordance with the invention. In this exemplary embodiment, ID tag 105 is located in tagged object 210. ID tag 105 represents, in a generic manner, one of ID tags 105A, 105B and 105C that were described above with reference to FIG. 1. ID tag 105 contains a power conservation system 225 that is coupled to ID circuit 215. ID circuit 215 contains various types of circuitry in various types of implementations.

For example, in a first implementation, ID circuit 215 includes a transmitter that is operative to provide a one-way transmission of ID information from ID tag 105 to an ID tag reader, such as ID tag reader 140 of FIG. 1.

In a second exemplary implementation, ID circuit 215 incorporates a receiver operative to receive one-way control signals from an ID tag reader.

In a third exemplary implementation, ID circuit 215 includes a transceiver, which provides two-way transmission of ID information, control information, and data between ID tag 105 and an ID tag reader. Similarly, in various other embodiments, ID circuit 215 contains various other types of circuitry. Furthermore, ID circuit 215 typically contains a power source, a battery for example, that is used to power various components of ID tag 105.

Power conservation system 225 operates to place ID tag 105 in the offline or the online state by interacting with ID circuit 215. In one exemplary embodiment, power conservation system 225 operates to place ID tag 105 in the offline state by disconnecting the power source from one or more circuits contained in ID tag 105. This aspect will be described below in further detail using FIG. 3.

Figure 3:
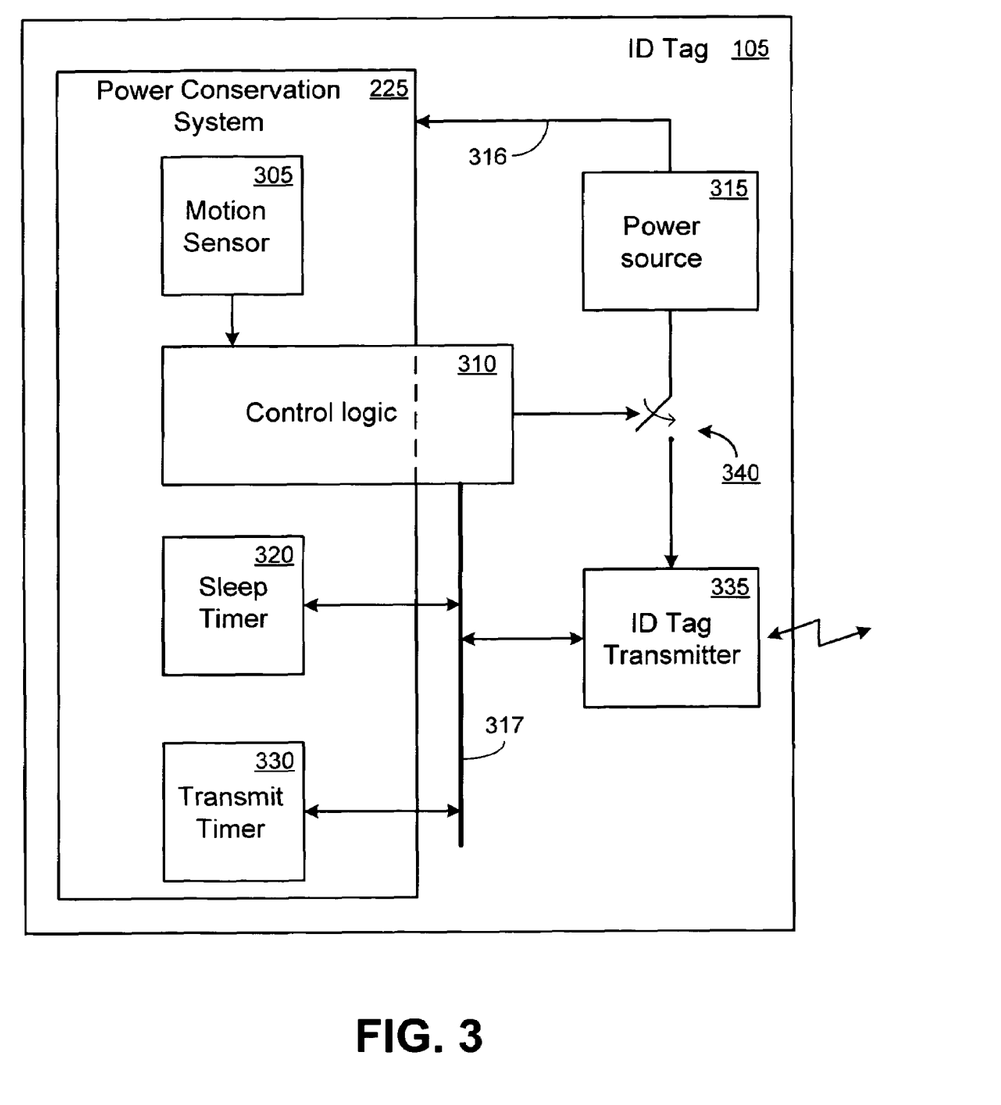
FIG. 3 shows a power conservation system incorporated into the ID tag of FIG. 2.

FIG. 3 shows one exemplary embodiment in accordance with the invention, of power conservation system 225 coupled to ID tag transmitter 335, which is a part of an ID circuit, such as ID circuit 215 of FIG. 2. In this embodiment, ID tag 105 contains a power source 315, a battery for example, which provides power to ID tag transmitter 335. Power source 315 may additionally provide power to power conservation system 225, as shown in FIG. 3 by connection 316, although a separate power source may be used for this purpose if so desired.

Power conservation system 225 contains a motion sensor 305 coupled to control logic 310. Also coupled to control logic 310 through a bus 317, is a sleep timer 320 and a transmit timer 330. Motion sensor 305 is used to detect motion of ID tag 105, which in turn, provides motion information of an object, such as tagged object 110 of FIG. 1, when ID tag 105 is mounted on the object.

Sleep timer 320 provides a timer function to enable placement of ID tag 105 in the sleep mode when no motion is detected in the tagged object for a pre-determined period of time. Transmit timer 330 provides a second timer function to enable placement of ID tag transmitter 335 in a power-down mode as a part of placing ID tag 105 in the sleep mode under certain other conditions. It will be understood that in various embodiments, one or more of these three components—motion sensor 305, sleep timer 320, and transmit timer 330, may be omitted.

Operation of motion sensor 305, sleep timer 320, and transmit timer 330 will now be described using FIG. 3 as well as FIG. 1 and the associated example that was described above. In the described example, tagged object 110, containing ID tag 105A, is a first item stored upon a shelf located on the sales floor of a store. Tagged object 115, containing ID tag 105B, is a second item stored upon a pallet in the storeroom of the store. Tagged object 125, which contains ID tag 105C, is a third item that is being carried by a customer to a payment counter in the store.

In this condition, each of the ID tags 105A and 105B is currently placed in an offline state, while ID tag 105C is placed in an online state. The offline state is initiated by control logic 310 providing a first control signal to switch 340. In response to this first control signal, switch 340 is activated to disconnect power source 315 from ID tag transmitter 335 thereby minimizing power consumption in ID tag 105A.

However, at a later instant, for example, when a customer lifts tagged object 110 containing ID tag 105A from the shelf located on the sales floor, motion sensor 305, which is a part of ID tag 105A, detects the resulting motion of tagged object 110 and transmits a trigger signal to control logic 310 alerting control logic 310 to initiate placement of ID tag 105A in an online state. Control logic 310 carries out this transition, by providing a second control signal to switch 340. The second control signal activates switch 340, thereby connecting power source 315 to ID tag transmitter 335.

It will be understood that in a first exemplary embodiment, control logic 310 is wholly contained inside the block designated as power conservation system 225. However, in a second exemplary embodiment, control logic 310 uses some components of ID tag 105 in a shared manner to carry out one or more functions of power conservation system 225. For example, such shared circuitry may include a controller device (not shown) of ID tag 105, the controller device being used to operate ID tag transmitter 335 as well as power conservation system 225. Another example of shared circuitry includes a memory device (not shown) of ID tag 105, the memory device being used to commonly store a program to operate ID tag 105 as well as a program to operate power conservation system 225. Details of such as a system will be described below using FIG. 5.

In the exemplary embodiment shown in FIG. 3, power conservation system 225 is implemented as a hardware system. Such a hardware system can be implemented with any one or more of the following technologies: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

The operation of sleep timer 320 and transmit timer 330 will be described below using other figures.

Figure 4A:
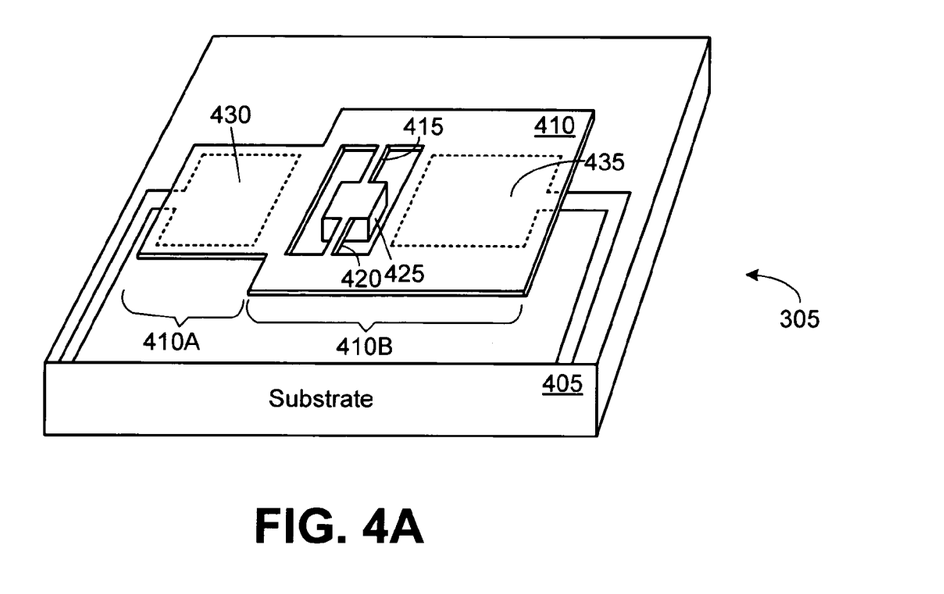
FIG. 4A shows an isometric view of an exemplary motion sensor associated with the power conservation system of FIG. 3.

Attention is now drawn to FIG. 4A, which shows a perspective view of an exemplary embodiment in accordance with the invention of motion sensor 305. In this example, motion sensor 305 is a micro machined element that is sometimes referred to in the art as a micro electro mechanical system (MEMS). Motion sensor 305 is packaged in a compact form factor that is advantageous for attaching motion sensor 305 to a tagged object for sensing motion in the tagged object. Motion sensor 305 incorporates a substrate 405 upon which is located a pedestal 425. Pedestal 425 supports a metal plate 410, which is a nickel plate in one example.

Metal plate 410 has an asymmetrical shape, with a first section 410A having a smaller area than a second section 410B. Consequently, section 410A is lighter than section 410B. Balancing equilibrium is maintained by mounting metal plate 410 in an offset manner such that the center of mass of metal plate 410 rests directly on pedestal 425 with swiveling freedom provided by torsion bars 415 and 420. When motion sensor 305 is disturbed, due to motion in the tagged object upon which motion sensor 305 is mounted, metal plate 410 swivels in response. The swiveling action is constrained only by the spring constant of torsion bars 415 and 420.

On substrate 405 below section 410A is a first conductive capacitor plate 430. Capacitor plate 430, section 410A and the air gap in between constitute a first capacitor whose capacitance varies with a variation of the separation distance between section 410A and capacitor plate 430 as metal plate 410 pivots on pedestal 425. Similarly, on substrate 405 below section 410B is a second conductive capacitor plate 435. Capacitor plate 435, section 410B and the air gap in between constitute a second capacitor whose capacitance varies with a variation of the separation distance between section 410B and capacitor plate 435 as metal plate 410 pivots on pedestal 425.

Figure 4B:
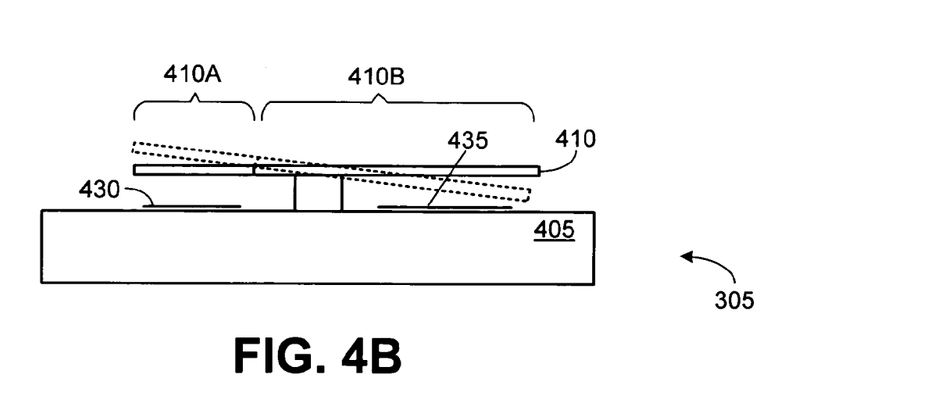
FIG. 4B shows a side-view of the motion sensor of FIG. 4A.

Attention is now drawn to FIG. 4B which shows a side view of motion sensor 305. In a quiescent state, metal plate 410 remains at an equilibrium condition wherein the two sections 410A and 410B are separated by identical distances from their corresponding capacitor plates 430 and 435. When motion sensor 305 is disturbed due to motion by the tagged object upon which motion sensor 305 is mounted, metal plate 410 tilts towards one side. For example, as shown by a dashed depiction of metal plate 410, section 410B moves closer to capacitor plate 435 while section 410A moves away from capacitor plate 430. As a result of this movement, the capacitance of the second capacitor increases in value, while that of the first capacitor decreases correspondingly.

The first and second capacitors are typically configured as a part of a capacitive bridge (not shown) that is used to detect the change in capacitance, thereby indicating motion in the tagged object. The output of the capacitive bridge is a trigger signal used to initiate either the sleep mode or the active mode. The capacitive bridge may be incorporated into power conservation system 225 of FIG. 3.

Figure 5:
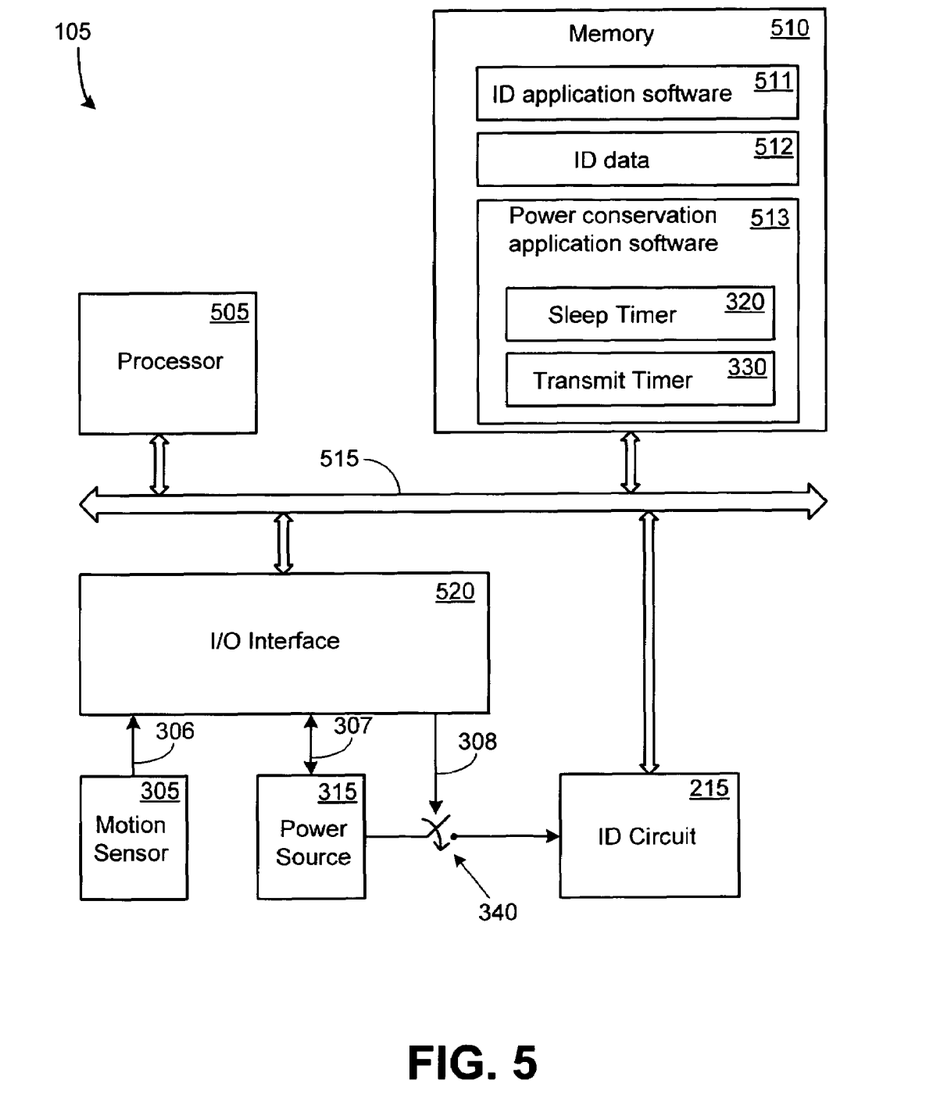
FIG. 5 shows an exemplary embodiment of an ID tag that includes a software implementation of certain functions related to the power conservation system.

FIG. 5 shows an exemplary embodiment in accordance with the invention, of an ID tag 105 where some parts of power conservation system 225, which was described above using FIG. 3, are integrated into ID tag circuitry of ID tag 105. In this exemplary embodiment, power conservation system 225 is implemented in a combination of hardware and software (e.g., firmware). The software is provided as an executable program, which is executed by a processor 505 that is also used to implement ID-related functionality of ID tag 105.

Generally, in terms of hardware architecture, ID tag 105 includes a processor 505, memory 510, ID circuit 215, and an input/output (I/O) interface 520, which are communicatively coupled to one another via a local interface 515. While I/O interface 520 is shown as a separate block, in certain embodiments, I/O interface 520 is integrated into processor 505, which may be then consequently referred to as a microcontroller. ID circuit 215 contains various ID-related components, for example: a transmitter and/or a receiver.

The local interface 515 can be, for example but not limited to, one or more buses or other wired connections. The local interface 515 may have additional elements, which are omitted for simplicity, such as controllers, buffers (caches), drivers, repeaters, and receivers, to enable communications. Further, local interface 515 may include address, control, and/or data connections to enable appropriate communications among the aforementioned components.

The processor 505 is a hardware device for executing software, particularly that stored in memory 510. The processor 505 can be any custom made or commercially available processor, a central processing unit (CPU), an auxiliary processor among several processors associated with the ID tag 105, a semiconductor based microprocessor (in the form of a microchip or chip set), a macroprocessor, or generally any device for executing software instructions.

The memory 510 includes any one or a combination of volatile memory elements (e.g. random access memory (RAM), such as DRAM, SRAM, SDRAM, etc.) and nonvolatile memory elements (e.g., ROM, hard drive, tape, CDROM, etc.). Moreover, in various embodiments, memory 510 incorporates electronic, magnetic, optical, and/or other types of storage media. Furthermore, in certain embodiments, memory 510 has a distributed architecture, where various components are situated remote from one another, but individually accessible by processor 505.

The software in memory 510 includes one or more separate programs, each of which comprises an ordered listing of executable instructions for implementing logical functions. In the exemplary embodiment shown in FIG. 5, the software in memory 510 includes ID application software 511 for implementing ID tag related functions such as, for example, directing ID circuit 215 to communicate with an ID tag reader (not shown). Additional functions include storing and/or retrieving ID-related data in/from ID data storage 512. ID-related data includes, for example, position information of the tagged object upon which ID tag 105 is mounted, a description of the tagged object, and whether the tagged object is in an online or an offline state.

The software in memory 510 further includes power conservation application software 513. Power conservation application software 513 includes application software for implementing power conservation in ID tag 105. In this exemplary embodiment, power conservation application software 513 further contains one or more programs to implement sleep timer 320 and transmit timer 330. Implementing such timers in software eliminates the need for hardware timers, thereby leading to a potential reduction in cost as well as potential conservation of real-estate inside ID tag 105.

I/O interface 520 allows various hardware elements to communicatively couple with processor 505 as well as other elements that are connected to local interface 515. Three such hardware elements: motion sensor 305, power source 315, and switch 340, as shown in FIG. 5.

Motion sensor 305 provides a trigger signal to I/O interface 520 via connection 306. I/O interface 520 couples this trigger signal to processor 505 via local interface 515. Power source 315 is coupled to I/O interface 520 via an optional connection 307. In one embodiment, processor 505 issues a command, an "enter offline state" command, for example, which is transmitted via local interface 515 and I/O interface 520 to power source 315. The command is received by power source 315 and used to disconnect power from one or more circuits of ID tag 105—for example, certain line driver integrated circuits (not shown).

Switch 340 is coupled to I/O interface 520 via connection 308. In one embodiment, processor 505 issues a command via local interface 515 to I/O interface 520, which transfers the command to switch 340 via connection 308. The command may be a switch control signal to activate switch 340 to either couple or decouple power source 315 from ID circuit 215.

The circuit shown in FIG. 5 may be packaged in several alternative ways. For example, in a first exemplary embodiment, motion sensor 305 is integrated into a common package along with processor 505 and other elements shown in FIG. 5. However, in an alternative exemplary embodiment, motion sensor 305 is a separately packaged element that is mounted on a convenient location of a tagged object remote from ID tag 105 containing processor 505 and the other elements shown in FIG. 5. When mounted remotely, motion sensor 305 is coupled to ID tag 105 using one or more alternative communication links, such as, but not limited to, a wired link, a wireless link, and an optical link.

As a further example, in a first embodiment, power source 315 is a battery that is integrated into a common package along with processor 505 and other elements shown in FIG. 5. However, in a second embodiment, the battery is an external battery that is connected by a wire to ID tag 105 containing processor 505 and the other elements shown in FIG. 5.

When ID tag 105 is in operation, processor 505 is configured to execute software stored within memory 510, to communicate data to and from memory 510, and to generally control operations of ID tag 105 pursuant to the software. The ID application software 511 and the power conservation application software 513, in whole or in part, but typically the latter, are read by the processor 505, perhaps buffered within the processor 505, and then executed.

The power conservation application software 513 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CD ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 6:
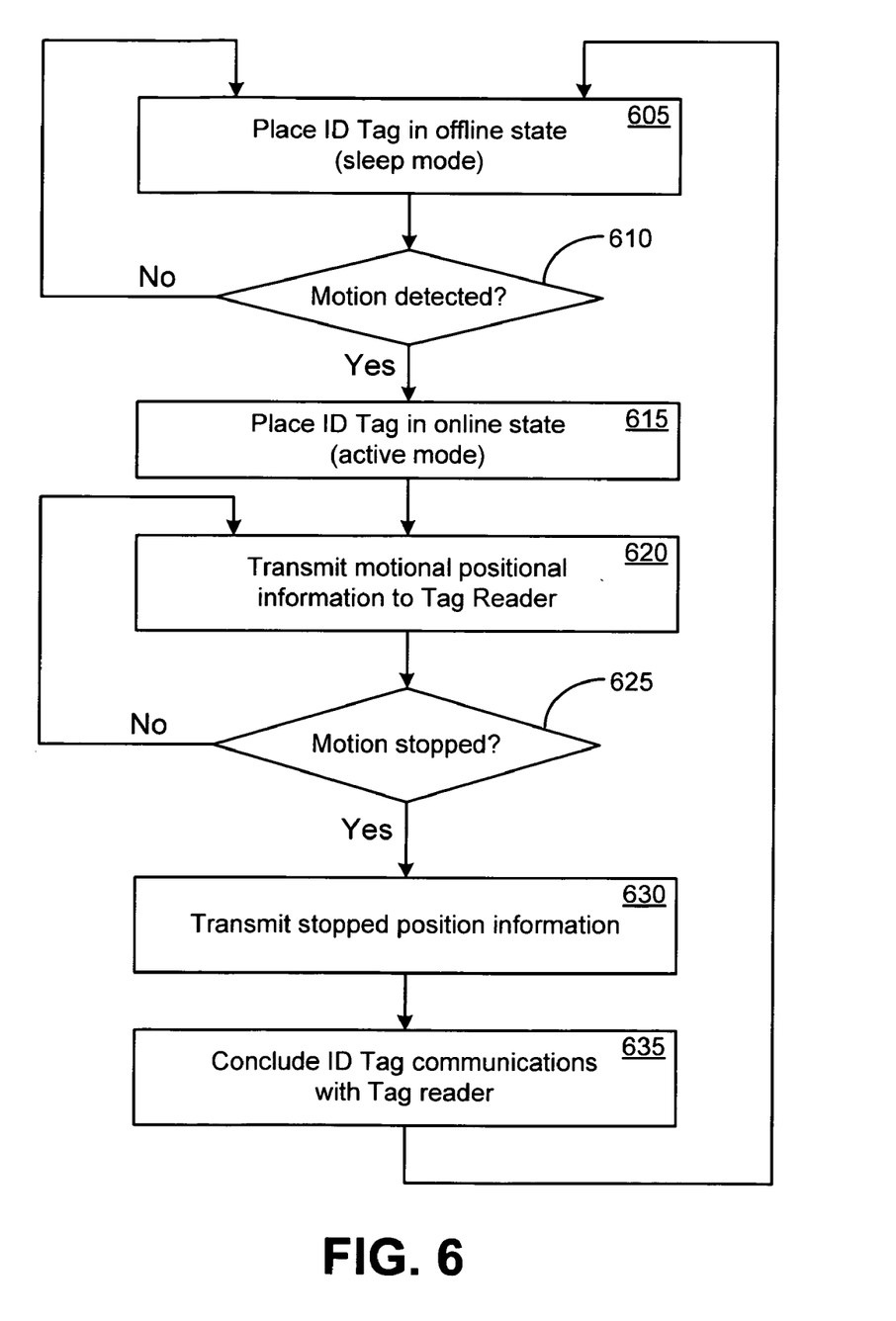
FIG. 6 shows a flowchart of a first exemplary method of operation of an ID tag in accordance with the invention.

FIG. 6 shows a flowchart of a first exemplary method of operation of an ID tag in accordance with the invention. In block 605, the ID tag is placed in an offline state, alternatively referred to as a sleep mode, when the tagged object has not been moved for a certain length of time. In block 610, motion of the tagged object is sensed. If no motion is detected, the ID tag continues to be placed in the sleep mode. However, if motion is detected, ID tag is transitioned from the offline state to an online state, which is alternatively referred to as an active mode. Placing the ID tag in an online state, as indicated by block 615, has been described above using earlier figures.

In block 620, a transmitter of the ID tag is operated to transmit to an ID tag reader, positional information of the tagged object. The positional information may be used by the ID tag reader to track the tagged object, which may be an item being transferred by a store employee from a warehouse to a storeroom shelf. In certain cases, the ID tag may use a transceiver to transmit and/or receive other information in addition to, or in lieu of, the positional information. For example, the additional information may be used to identify the item being moved and also to provide to the store employee, a shelf location in the store for placing the item.

In block 625, the motion sensor of the ID tag is used to continue detection of motion in the tagged object. As long as such motion is detected, the ID tag continues to transmit positional information of the tagged object. When motion is no longer detected, the ID tag transmits "stopped" position information as indicated in block 630. The stopped position corresponds to the location, for example, the shelf in the store, where the tagged object is finally placed. In block 635, the ID tag concludes communication with the ID tag reader before placing the ID tag in the sleep mode.

Figure 7:
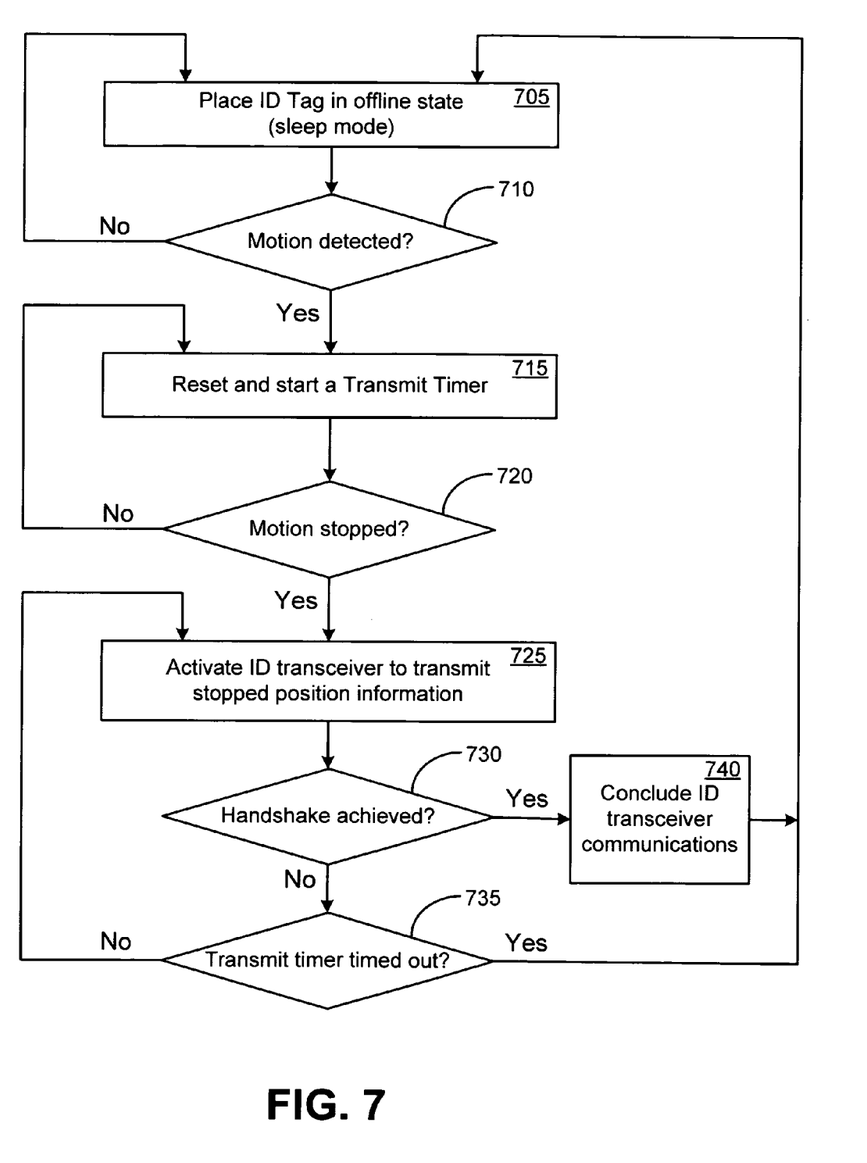
FIG. 7 shows a flowchart of a second exemplary method of operation of an ID tag in accordance with the invention.

FIG. 7 shows a flowchart of a second exemplary method of operation of an ID tag in accordance with the invention. Blocks 705 and 710 generally correspond in functionality, to blocks 605 and 610 of FIG. 6. However, once motion is detected in the step of block 710, a transmit timer is reset and started as indicated in block 715. The transmit timer is set to a suitably selected time. For example, the transmit timer of an ID tag placed on a store item, may be set for one hour to permit the ID tag to communicate with the ID tag reader. As long as the item is in motion, the transmit timer is continuously reset and restarted as indicated in FIG. 7 by block 720 in conjunction with block 715.

Once motion is no longer detected, in block 725, a transceiver of the ID tag is operated to initiate communications with the ID tag reader. The ID tag then transmits information that includes stopped position information. Once communications have been concluded, the ID tag transitions into the sleep mode. This sequence is indicated in FIG. 7 by blocks 730, 740, and 705.

If the ID tag transceiver is unable to communicatively couple with an ID tag reader, repeated attempts are made, as indicated in FIG. 7 by block 735 operating in conjunction with block 725. The attempts are continued for a period of time determined by the transmit timer. When the transmit timer has timed out, the ID tag transmissions are discontinued and the ID tag is placed in the sleep mode. The transmit timer thereby prevents unnecessary operation of the ID tag and the associated power wastage when the ID tag reader is unavailable for communication with the ID tag.

Figure 8:
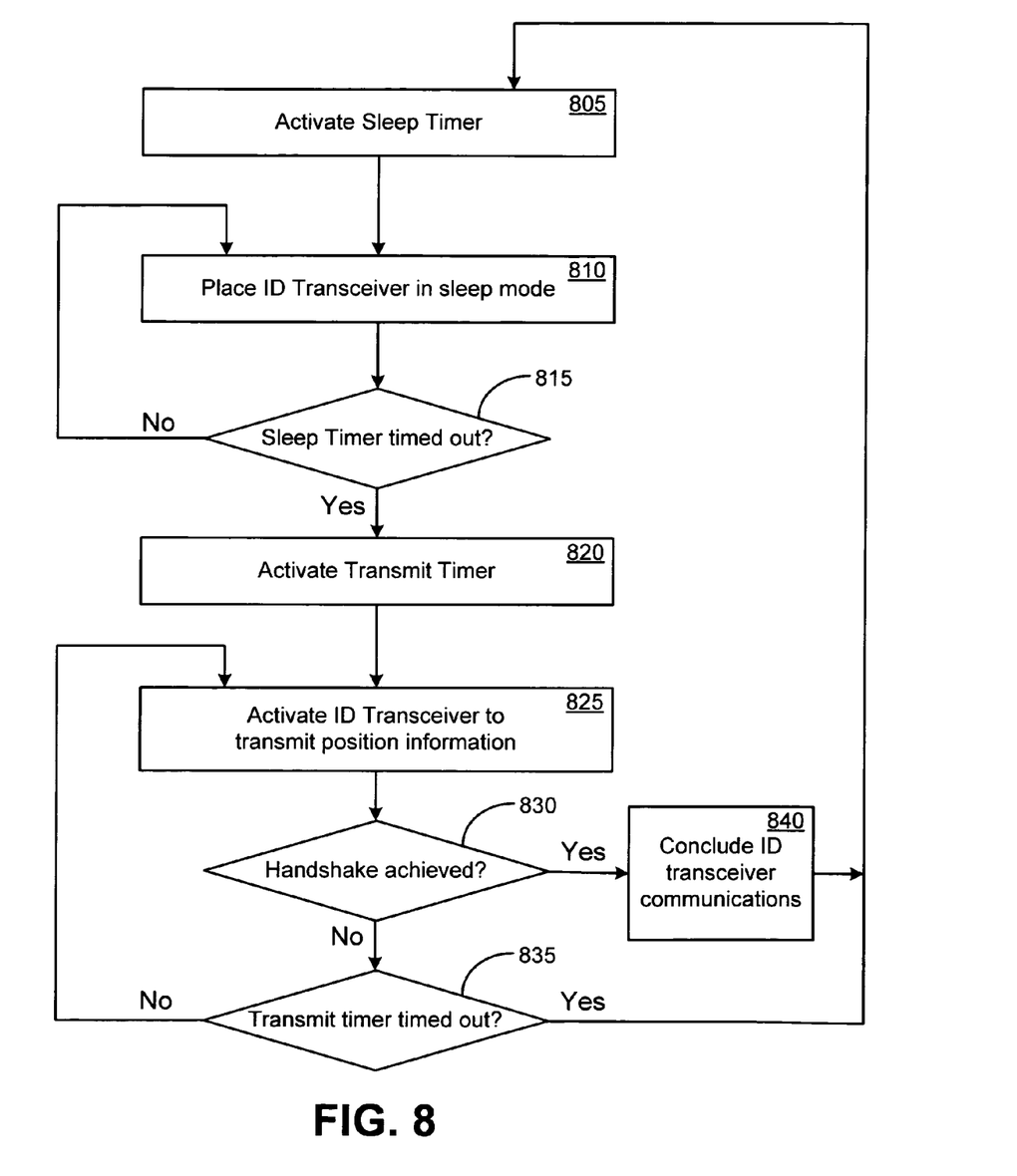
FIG. 8 shows a flowchart of a third exemplary method of operation of an ID tag in accordance with the invention.

FIG. 8 shows a flowchart of a third exemplary method of operation of an ID tag in accordance with the invention. This method utilizes a sleep timer in lieu of, or in addition to, a motion sensor. In block 805, the sleep timer is programmed to provide a sleep timeout functionality when communication between the ID tag and an ID tag reader is unnecessary on a continuous basis. For example, continuous communications between the ID tag and the ID tag reader may be unnecessary if the tagged object has not been moved since the last communication between the ID tag and the ID tag reader. In one case, this situation pertains to a tagged object placed in a warehouse for long-term storage. The ID tag of this tagged object may communicate with the ID tag reader on an occasional basis merely to indicate that the location status has remained unchanged. This procedure is described below in more detail.

In block 810, the ID tag is placed in a sleep mode for minimizing power consumption. In block 815, a determination is made to detect a time out of the sleep timer. If the sleep timer has not timed out, the ID transceiver continues to be placed in the sleep mode. However, if the sleep timer has timed out, a transmit timer is activated as indicated in block 820.

In block 825, a transceiver of the ID tag is operated to initiate communications with the ID tag reader. The ID tag then transmits positional information of the ID tag, and by extension, that of an object upon which it may be mounted. Once communications between the ID tag and the ID tag reader have been concluded, the ID tag transitions into the sleep mode. This sequence is indicated in FIG. 8 by blocks 830, 840, and 805. If the ID tag transceiver is unable to communicatively couple with an ID tag reader, repeated attempts are made, as indicated in FIG. 8 by block 835 operating in conjunction with block 825. The attempts are continued for a period of time determined by the transmit timer. When the transmit timer has timed out, the ID tag transmissions are discontinued and the ID tag is placed in the sleep mode. The transmit timer thereby prevents unnecessary operation of the ID tag and the associated power wastage when the ID tag reader is not ready, or is unavailable, for communication with the ID tag.

The above-described embodiments are merely set forth for a clear understanding of the principles of the disclosure. Many variations and modifications may be made without departing substantially from the disclosure. All such modifications and variations are included herein within the scope of this disclosure.

I claim:

1. An identification (ID) tag comprising:
   a motion sensor operable to generate a trigger signal when moved, whereby the ID tag is placed in an online state in response thereof;
   an ID tag transmitter;
   a transmit timer configured to provide a timeout function to the ID tag transmitter;
   a switch;
   a power source configured to provide power to the ID tag transmitter through the switch;
   control logic configured to provide a first control signal to the switch for coupling the power source to the ID tag transmitter while the ID tag is in motion; and
   a sleep timer operable to place the ID tag in a sleep mode wherein the ID tag is in an offline state for reduced power consumption in the ID tag when motion is no longer detected by the motion sensor.

2. The ID tag of claim 1, wherein the motion sensor is a micro electro-mechanical system (MEMS) device.

3. The ID tag of claim 1, wherein the ID tag transmitter is configured to provide communicative coupling between the ID tag and an ID tag reader over one of a) a radio frequency (RF) communication link, b) an infrared (IR) communication link, c) an optical communication link and d) a cellular communication link.

4. A method of operating an identification (ID) tag mounted on an object, the method comprising:
   providing a motion sensor to generate a trigger signal upon detecting motion of the object;
   using the trigger signal to place the ID tag in an online state;
   activating a transmitter of the ID tag for transmitting information while the object is in motion, the information comprising an identity of the object on which the ID tag is mounted;
   providing a transmit timer;
   continuously resetting and restarting the transmit timer as long as the object is in motion; and
   placing the ID tag in a sleep mode when motion is no longer detected.

5. The method of claim 4, further comprising:
   activating a receiver of the ID tag for receiving information comprising a location for placing the object.

6. The method of claim 4, wherein placing the ID tag in the sleep mode comprises:
   placing the ID tag in the sleep mode when the ID tag is in one of a) a first state wherein the transmit timer has not timed out and ID tag communications between the ID tag and an ID tag reader have been concluded and b) a second state wherein the transmit timer has timed out.

7. A method of operating an identification (ID) tag, the method comprising:
   providing a transmit timer;
   providing a sleep timer;
   resetting and initiating the sleep timer to generate a sleep time;
   placing the ID tag in a sleep mode during the sleep time;
   activating the transmit timer when the sleep timer has timed out and the ID tag is no longer in the sleep mode;
   activating the ID tag to establish communication between the ID tag and an ID tag reader; and
   resetting and initiating the sleep timer when communication has been concluded between the ID tag and the ID tag reader regardless of the state of the transmit timer.

8. A program stored on a computer-readable medium for operating an identification (ID) tag of an ID system, the program comprising:
   logic configured to place an ID tag in a sleep mode wherein the ID tag is in an offline state;
   logic configured to receive a trigger signal indicating motion of an object to which the tag is attached;

logic configured to transition the ID tag from the sleep mode to an active mode wherein the ID tag is in placed in an online state in response to receiving the trigger signal;

logic configured to initiate the ID tag to transmit information while the object is in motion, the information comprising an identity of the object being moved;

logic configured to provide a transmit timer; and logic configured to place the ID tag in a sleep mode when the ID tag is in one of a) a first state wherein the transmit timer has not timed out and communications between the ID tag and an ID tag reader have been concluded, b) a second state wherein the transmit timer has timed out and c) when the object is no longer in motion.

9. The program of claim 8, further comprising:

logic configured to continuously reset and start the transmit timer when the trigger signal is active.

\* \* \* \* \*